US012547381B2

(12) United States Patent
Mitra et al.

(10) Patent No.: US 12,547,381 B2
(45) Date of Patent: Feb. 10, 2026

(54) METHOD AND SYSTEM FOR AUTOMATED LOW-CODE NO-CODE MODEL DEPLOYMENT

(71) Applicant: JPMorgan Chase Bank, N.A., New York, NY (US)

(72) Inventors: Abhishek Mitra, Bangalore (IN); Richa Malik, Bengaluru (IN); Gaurav Karkal, Bangalore (IN); Radha Jayaraman, Gautam Buddha Nagar (IN); Parul Verma, Patna (IN); Shankhadeep Roy, Chennai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 220 days.

(21) Appl. No.: 18/422,475

(22) Filed: Jan. 25, 2024

(65) Prior Publication Data
US 2025/0190182 A1 Jun. 12, 2025

(30) Foreign Application Priority Data
Dec. 12, 2023 (IN) .............................. 202311084757

(51) Int. Cl.
| | |
|---|---|
| G06F 9/44 | (2018.01) |
| G06F 8/35 | (2018.01) |
| G06F 8/36 | (2018.01) |
| G06F 8/41 | (2018.01) |
| G06F 8/60 | (2018.01) |
| G06F 9/451 | (2018.01) |
| G06F 9/455 | (2018.01) |
| H04L 29/08 | (2006.01) |

(52) U.S. Cl.
CPC ................. *G06F 8/35* (2013.01); *G06F 8/36* (2013.01); *G06F 8/60* (2013.01); *G06F 9/451* (2018.02)

(58) Field of Classification Search
CPC .............. G06F 8/35; G06F 9/451; G06F 8/36; G06F 8/60; G06F 9/45558; G06F 3/0482; G06F 11/3684; G06F 3/0486; G06F 8/61; G06F 9/5072; G06F 11/3698; G06F 11/3688; G06F 9/547
See application file for complete search history.

(56) References Cited
U.S. PATENT DOCUMENTS

| | | | | |
|---|---|---|---|---|
| 12,020,009 | B2* | 6/2024 | Tripathi | .................... G06F 8/60 |
| 12,321,737 | B1* | 6/2025 | Desai | ........................ G06F 8/71 |

* cited by examiner

*Primary Examiner* — Thuy Dao
(74) *Attorney, Agent, or Firm* — GREENBLUM & BERNSTEIN, P.L.C.

(57) ABSTRACT

A method and a system for automatically deploying a low-code no-code model are disclosed. The method includes receiving an input in at least one format. The method includes analyzing, using a trained model, the input to generate at least one recommendation. The method includes selecting at least one service from the service catalog database based on the generated at least one recommendation. The method includes generating an infrastructure script for the selected at least one service using an Infrastructure as Code (IAC) catalog database having a plurality of pre-defined IAC scripts. The method includes generating an application script for the generated infrastructure script using a code catalog database having a plurality of application scripts. The method includes generating an application code for deployment based on an integration of the selected at least one service and the generated application script.

20 Claims, 5 Drawing Sheets

METHOD AND SYSTEM FOR AUTOMATED LOW-CODE NO-CODE MODEL DEPLOYMENT

CROSS-REFERENCE TO RELATED APPLICATIONS

This application claims priority benefit from Indian Application No. 202311084757, filed on 12 Dec. 2023 in the India Patent Office, which is hereby incorporated by reference in its entirety.

FIELD OF THE DISCLOSURE

This technology generally relates to code deployment, and more particularly relates to methods and systems for low-code no-code based automated model deployment.

BACKGROUND INFORMATION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

With the increase in the adoption of cloud solutions, businesses and organizations seek to leverage the benefits of scalability, flexibility, and cost-efficiency offered by cloud platforms. However, the complexity of cloud architectures, the vast array of available services, and the need for seamless integration pose challenges for development teams. Conventional approaches to software development for the cloud often involve extensive research, manual decision-making processes, and labor-intensive coding efforts. This further leads to delays in time-to-market and impacts overall productivity.

Automated software development tools and frameworks have been introduced to alleviate some of these challenges. However, existing solutions often lack the ability to comprehensively automate architectural decisions and code implementations, especially in the context of cloud development, where extensive documentation and prior knowledge are readily available.

Additionally, conventional software development processes have often required significant technical knowledge and expertise, making it challenging for non-technical stakeholders or citizen developers to actively participate in the development and deployment of software applications. On the other hand, conventional software development lifecycle (SDLC) and model development lifecycle (MDLC) methodologies have relied heavily on manual coding, resulting in time-consuming and error-prone processes.

Hence, in view of these and other existing limitations, there arises an imperative need to provide an efficient solution to overcome the above-mentioned limitations and to provide a method and a system for automating both architectural decisions and code implementations.

SUMMARY

The present disclosure, through one or more of its various aspects, embodiments, and/or specific features or sub-components, provides, inter alia, various systems, servers, devices, methods, media, programs, and platforms for low-code no-code automated infrastructure deployment.

According to an aspect of the present disclosure, a method for automatically deploying a low-code no-code model is disclosed. The method is implemented by at least one processor. The method includes receiving, by the at least one processor from a user, an input in at least one format. In addition, the method includes analyzing, by the at least one processor using a trained model, the input to generate at least one recommendation, wherein the at least one recommendation is generated using a service catalog database. Further, the method includes selecting, by the at least one processor, at least one service from the service catalog database based on the generated at least one recommendation. Furthermore, the method includes generating, by the at least one processor, an infrastructure script for the selected at least one service using an Infrastructure as Code (IAC) catalog database having a plurality of pre-defined IAC scripts. Moreover, the method includes generating, by the at least one processor, an application script for the generated infrastructure script using a code catalog database having a plurality of application scripts. Thereafter, the method includes generating, by the at least one processor, an application code for deployment based on an integration of the selected at least one service and the generated application script.

In accordance with an exemplary embodiment, the application code is deployed automatically in a target environment, wherein the target environment is configured based at least on provisions defined in the IAC catalog database.

In accordance with an exemplary embodiment, the at least one format comprises at least one from among a configuration file format, a text format, an audio format, a visual format, and a combination thereof.

In accordance with an exemplary embodiment, the method comprises rendering a user interface (UI) on a display screen of a user device for receiving the input from the user.

In accordance with an exemplary embodiment, the at least one recommendation comprises at least one from among an artificial intelligence (AI)-based recommendation and a rule-based recommendation.

In accordance with an exemplary embodiment, the service catalog database comprises a list of available services, application programming interfaces (APIs), functionalities, and components, and wherein the list of available services is provided by at least one from among at least one underlying cloud infrastructure, at least one third-party vendor, and at least one in-house development team.

In accordance with an exemplary embodiment, the IAC catalog database comprises at least one from among a collection of templates, configurations, and scripts defining provisioning and setup of infrastructure components required for development of an application.

In accordance with an exemplary embodiment, the code catalog database comprises a repository of reusable code modules, libraries, and code APIs.

According to another aspect of the present disclosure, a computing device configured to implement the execution of a method for automatically deploying a low-code no-code model is disclosed. The computing device comprises: a processor; a memory; and a communication interface coupled to each of the processor and the memory. The processor may be configured to receive, from a user via the communication interface, an input in at least one format. Next, the processor may be configured to analyze, using a trained model, the input to generate at least one recommendation, wherein the at least one recommendation is generated using a service catalog database. Then, the processor may be configured to select at least one service from the service catalog database based on the generated at least one recommendation. Further, the processor may be configured to generate an infrastructure script for the selected at least one service using an IAC catalog database having a plurality of pre-defined IAC scripts. Furthermore, the processor may be configured to generate an application script for the generated infrastructure script using a code catalog database having a plurality of application scripts. Also, the processor may be configured to generate an application code for deployment based on an integration of the selected at least one service and the generated application script.

In accordance with an exemplary embodiment, the application code is deployed automatically in a target environment, wherein the target environment is configured based at least on provisions defined in the IAC catalog database.

In accordance with an exemplary embodiment, the at least one format comprises at least one from among a configuration file format, a text format, an audio format, a visual format, and a combination thereof.

In accordance with an exemplary embodiment, the processor may be further configured to render a UI on a display screen of a user device to receive the input from the user.

In accordance with an exemplary embodiment, the at least one recommendation comprises at least one from among an AI-based recommendation and a rule-based recommendation.

In accordance with an exemplary embodiment, the service catalog database comprises a list of available services, APIs, functionalities, and components, and wherein the list of available services is provided by at least one from among at least one underlying cloud infrastructure, at least one third-party vendor, and at least one in-house development team.

In accordance with an exemplary embodiment, the IAC catalog database comprises at least one from among a collection of templates, configurations, and scripts defining provisioning and setup of infrastructure components required for development of an application.

In accordance with an exemplary embodiment, the code catalog database comprises a repository of reusable code modules, libraries, and code APIs.

According to yet another aspect of the present disclosure, a non-transitory computer-readable storage medium storing instructions for automatically deploying a low-code no-code model is disclosed. The instructions include executable code which, when executed by a processor, may cause the processor to receive, from a user, an input in at least one format; analyze, using a trained model, the input to generate at least one recommendation, wherein the at least one recommendation is generated using a service catalog database; select at least one service from the service catalog database based on the generated at least one recommendation; generate an infrastructure script for the selected at least one service using an IAC catalog database having a plurality of pre-defined IAC scripts; generate an application script for the generated infrastructure script using a code catalog database having a plurality of application scripts; and generate an application code for deployment based on an integration of the selected at least one service and the generated application script.

In accordance with an exemplary embodiment, the application code is deployed automatically in a target environment, wherein the target environment is configured based at least on provisions defined in the IAC catalog database.

In accordance with an exemplary embodiment, the at least one format comprises at least one from among a configuration file format, a text format, an audio format, a visual format, and a combination thereof.

In accordance with an exemplary embodiment, the executable code, when executed further causes the processor to render a UI on a display screen of a user device to receive the input from the user.

In accordance with an exemplary embodiment, the at least one recommendation comprises at least one from among an AI-based recommendation and a rule-based recommendation.

In accordance with an exemplary embodiment, the service catalog database comprises a list of available services, APIs, functionalities, and components, and wherein the list of available services is provided by at least one from among at least one underlying cloud infrastructure, at least one third-party vendor, and at least one in-house development team.

In accordance with an exemplary embodiment, the IAC catalog database comprises at least one from among a collection of templates, configurations, and scripts defining provisioning and setup of infrastructure components required for development of an application.

In accordance with an exemplary embodiment, the code catalog database comprises a repository of reusable code modules, libraries, and code APIs.

BRIEF DESCRIPTION OF THE DRAWINGS

The present disclosure is further described in the detailed description which follows, in reference to the noted plurality of drawings, by way of non-limiting examples of exemplary embodiments of the present disclosure, in which like characters represent like elements throughout the several views of the drawings.

DETAILED DESCRIPTION

Figure 1:
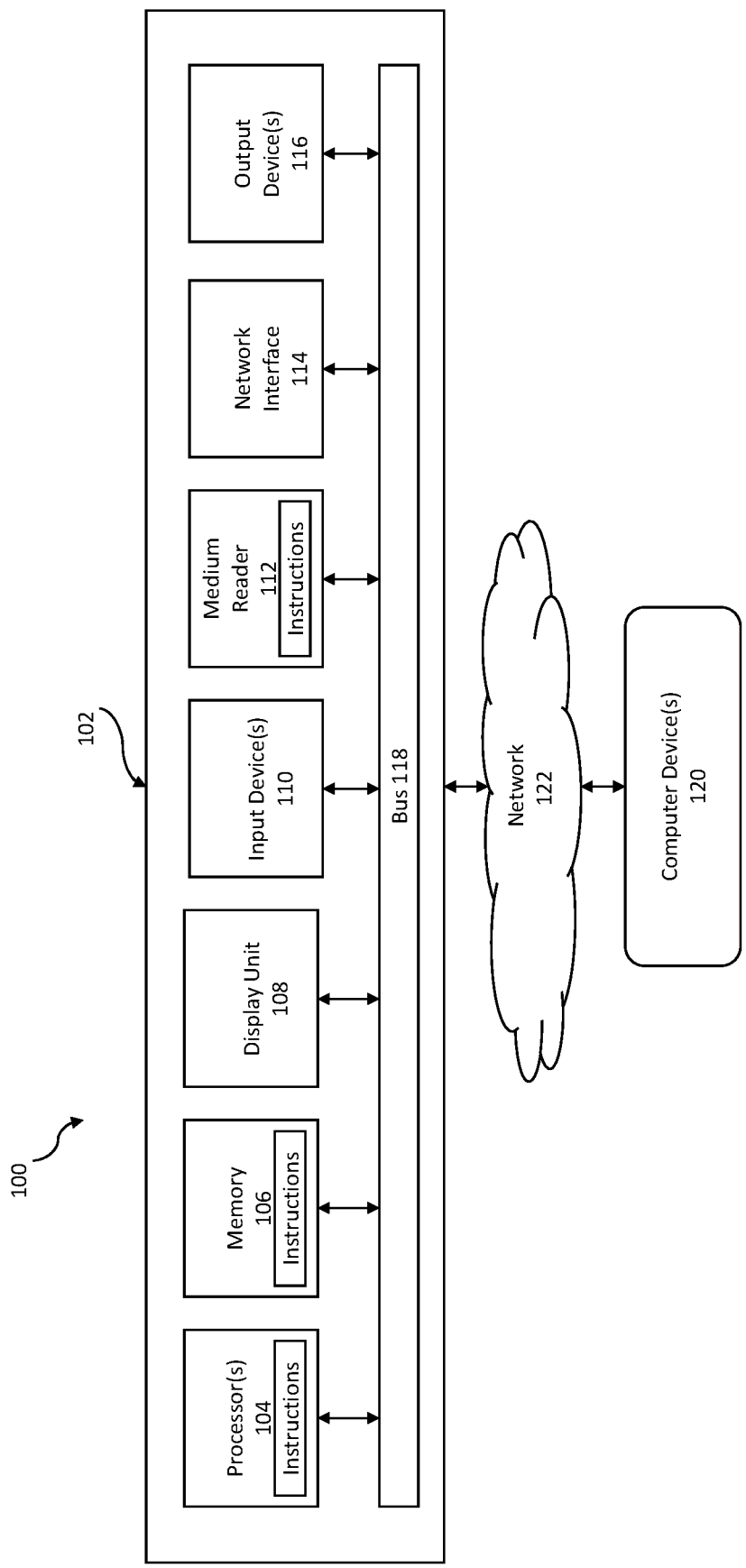
FIG. 1 illustrates an exemplary computer system for automatically deploying a low-code no-code model, in accordance with an exemplary embodiment.

Exemplary embodiments now will be described with reference to the accompanying drawings. The example embodiments may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the invention. It will be apparent, however, that the invention may be practiced without these specific details and features.

Through one or more of its various aspects, embodiments, and/or specific features or sub-components of the present disclosure, are intended to bring out one or more of the advantages as specifically described above and noted below.

The examples may also be embodied as one or more non-transitory computer-readable storage medium having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

To overcome problems associated with complexity and technical nature of software development lifecycle (SDLC) and model development lifecycle (MDLC), the present disclosure provides a method and a system for providing a cloud-native solution employing IAC deployment and configurable pipelines. The present disclosure provides the method and the system to configure an SDLC or MDLC pipeline automatically if configurations are provided properly in a configuration template.

The system may initially be configured to receive an input from a user device associated with the user. The input may be received in at least one format. In one implementation, the at least one format may include at least one from among a configuration file format, a text format, an audio format, a visual format, and/or a combination thereof.

Next, the system may be configured to analyze the input to generate at least one recommendation. The at least one recommendation may be generated using a service catalog database. In one implementation, the at least one recommendation includes a rule-based recommendation and/or an artificial intelligence (AI)-based recommendation. The system may be configured to analyze the input using a trained model. The trained model may include at least one from among a machine learning model, a deep learning model, an AI model, a neural network model, a natural language processing (NLP) model, and the like. The AI-based recommendations are generated based at least on implementation of the trained model to process the input. The service catalog database includes a list of available services, application programming interfaces (APIs), functionalities, and components, wherein the list of available services is provided by at least one from among underlying cloud infrastructures, third-party vendors, and/or in-house development teams.

Further, the system may be configured to receive services from the rule-based recommendations and AI based recommendations. In an embodiment, the services may be selected by the user based on the at least one recommendation. The user-selected services may be received from the user device of the user. Furthermore, the system may be configured to generate an infrastructure script for the selected at least one service using an IAC catalog database having a plurality of pre-defined IAC scripts. The infrastructure script configures the underlying computing resources required to execute a software application. The IAC catalog database includes at least collection of templates, configurations, and scripts defining provisioning and a setup of infrastructure components required for development of the software application.

Moreover, the system is configured to generate an application script for the generated infrastructure script using a code catalog database having a plurality of application scripts. The system may also be configured to generate an application code for deployment based on an integration of the selected at least one service and the generated application script. The system is then configured to deploy the application code automatically in a target environment. The target environment may be configured based at least on provisions defined in the IAC catalog database. The code catalog database includes a repository of reusable code modules, libraries, and code APIs.

FIG. 1 is an exemplary system for use in accordance with the embodiments described herein. The system 100 is generally shown and may include a computer system 102, which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, computer system 102 may include or be included within, any one or more computers, servers, systems, communication networks, or cloud-based environment. Even further, the instructions may be operative in a such cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As used herein, "low-code" refers to an approach that enables the creation and development of applications with minimal or no traditional coding efforts. For example, the method and system provide a low-code development platform or framework that provides pre-built components, templates, and tools to streamline the application or model development process.

As used herein, "no-code" refers to an approach that enables users with little to no coding experience to generate software applications. For example, the no-code development platform provides the user with visual interfaces, graphical design tools, and pre-configured modules to streamline the application or model development process.

As used herein, a "bi-directional conversation" refers to a communication exchange between two parties where information flows in both directions. In such a conversation, each participant can both transmit and receive information, creating a dynamic and interactive exchange.

As used herein, a "conversational agent" may represent an AI system or software application designed to engage in natural language conversations with the users. Some examples of the conversational agent include chatbots, virtual agents, dialogue systems, and so on. The conversational agent can interact with the users via text-based interfaces, voice interactions, audio-visual interactions, and/or a combination thereof.

As illustrated in FIG. 1, computer system 102 may include at least one processor 104. Processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories, as described herein, may be random access memory (RAM), read-only memory (ROM), flash memory, electrically programmable read-only memory (EPROM), electrically erasable programmable read-only memory (EEPROM), registers, a hard disk, a cache, a removable disk, tape, compact disk read-only memory (CD-ROM), digital versatile disk (DVD), floppy disk, Blu-ray disk, or any other form of storage medium known in the art. Memories may be volatile or non-volatile, secure and/or encrypted, and unsecured and/or unencrypted. As regards the present disclosure, the computer memory 106 may comprise any combination of memories or single storage.

The computer system 102 may further include a Display Unit 108, such as a liquid crystal display (LCD), an organic light emitting diode (OLED), a flat panel display, a solid-state display, a cathode ray tube (CRT), a plasma display, and/or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, and/or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by the processor 104, can be used to perform one or more of the methods and processes as described herein. In a particular embodiment, the instructions may reside completely, or at least partially, within the memory 106, the medium reader 112, and/or the processor 104 during execution by the computer system 102.

Furthermore, computer system 102 may include any additional devices, components, parts, peripherals, hardware, software, and/or any combination thereof which are commonly known and understood as being included with or within a computer system, such as but not limited to, a network interface 114 and an output device 116. The output device 116 may be, but is not limited to, a speaker, an audio out, a video out, a remote-control output, a printer, or any combination thereof. Additionally, the term "Network interface" may also be referred to as "Communication interface" and such phrases/terms can be used interchangeably in the specifications.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automated software development lifecycle (SDLC) or model development lifecycle (MDLC) deployment.

Figure 2:
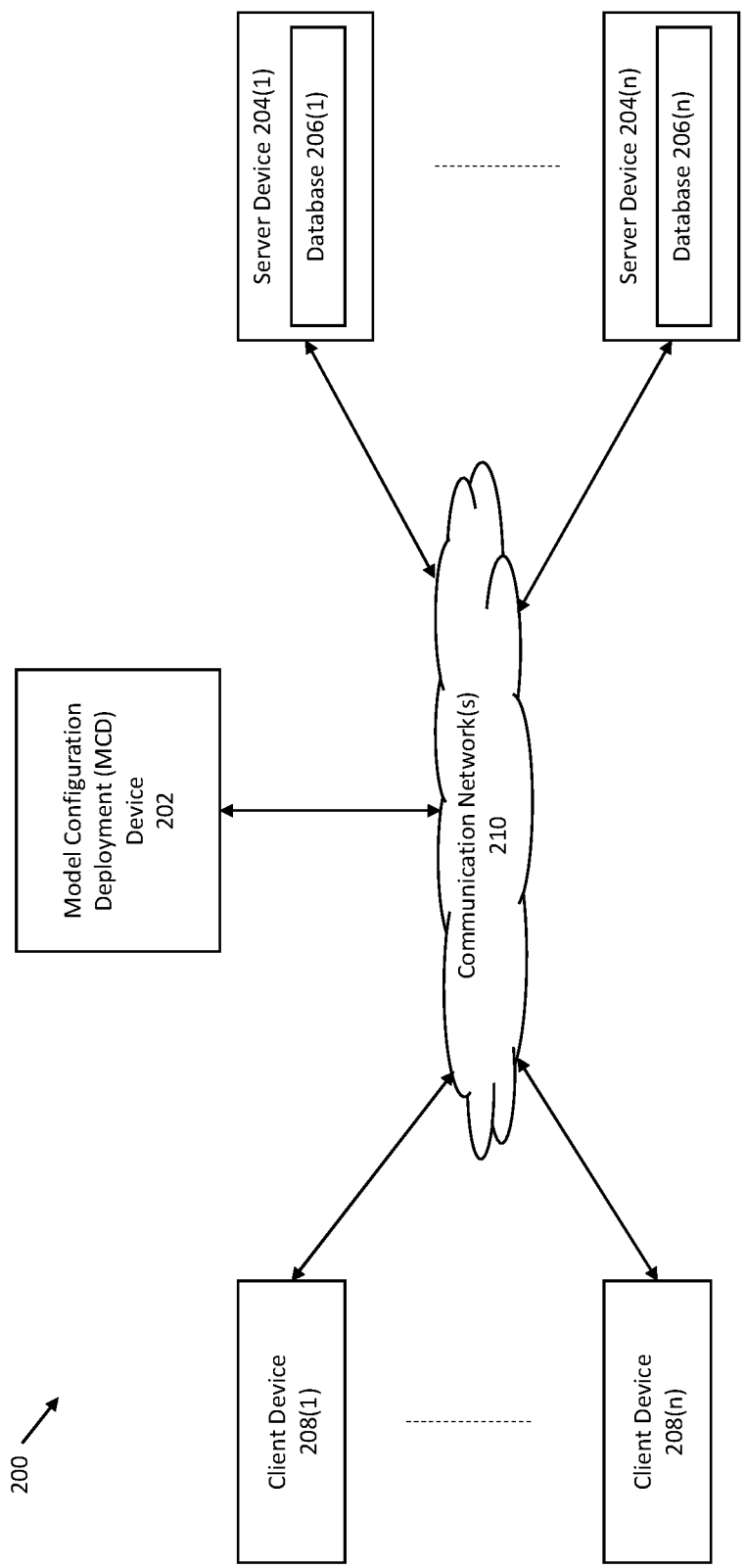
FIG. 2 illustrates an exemplary diagram of a network environment for automatically deploying a low-code no-code model, in accordance with an exemplary embodiment.

Referring to FIG. 2, a schematic of an exemplary network environment 200 for implementing a method for automatically deploying a low-code no-code model is illustrated. In an exemplary embodiment, the method is executable on any networked computer platform, such as, for example, a personal computer (PC).

The method for automatically deploying a low-code no-code model may be implemented by a model configuration deployment (MCD) device 202. The MCD device 202 may be the same or similar to the computer system 102 as described with respect to FIG. 1. The MCD device 202 may store one or more applications that can include executable instructions that, when executed by the MCD device 202, cause the MCD device 202 to perform desired actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

In a non-limiting example, the application(s) may be operative in a cloud-based computing environment. The application(s) may be executed within or as a virtual machine(s) or virtual server(s), that may be managed in a cloud-based computing environment. Also, the application(s), and even the MCD device 202 itself, may be located in the virtual server(s) running in a cloud-based computing environment rather than being tied to one or more specific physical network computing devices. Also, the application(s) may be running in one or more virtual machines (VMs) executing on the MCD device 202. Additionally, in one or more embodiments of this technology, virtual machine(s) running on the MCD device 202 may be managed or supervised by a hypervisor.

In the network environment 200 of FIG. 2, the MCD device 202 is coupled to a plurality of server devices 204(1)-204(n) that hosts a plurality of databases or repositories 206(1)-206(n), and also to a plurality of client devices 208(1)-208(n) via a communication network(s) 210. A communication interface of the MCD device 202, such as the network interface 114 of the computer system 102 of FIG. 1, operatively couples and communicates between the MCD device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MCD device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages, including methods, non-transitory computer-readable storage media, and the MCD device 202 that efficiently implements a method for deploying a low-code, no-code automated infrastructure.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies, including, for example, teletraffic in any suitable form (e.g., voice, modem, and the like), Public Switched Telephone Networks (PSTNs), Ethernet-based Packet Data Networks (PDNs), combinations thereof, and the like.

The MCD device 202 may be a standalone device or integrated with one or more other devices or apparatuses, such as one or more of the server devices 204(1)-204(n), for example. In one particular example, the MCD device 202 may include or be hosted by one of the server devices 204(1)-204(n), and other arrangements are also possible. Moreover, one or more of the devices of the MCD device 202 may be in the same or a different communication network, including one or more public, private, or cloud-based networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. In an example, the server devices 204(1)-204(n) may process requests received from the MCD device 202 via the communication network(s) 210 according to Hypertext Transfer Protocol (HTTP) based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases or repositories 206(1)-206(n) that are configured to store data that relates to model deployment, including services, APIs, functionalities, components, templates, configurations, scripts, reusable code modules, and libraries.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) is not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to-peer architecture, virtual machines, or within a cloud-based architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the MCD device 202 via communication network(s) 210. Accordingly, the client devices 208(1)-208(n) may be mobile computing devices, desktop computing devices, laptop computing devices, tablet computing devices, or the like, that host chat, e-mail, or voice-to-text applications, for example. In an exemplary embodiment, at least one client device 208 is a wireless mobile communication device, e.g., a smartphone.

The client devices 208(1)-208(n) may run interface applications, such as standard web browsers or standalone client applications, which may provide an interface communicate with the MCD device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the MCD device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MCD device 202, the server devices 204(1)-204(n), or the client devices 208(1)-208(n), for example, may be configured to operate as virtual instances on the same physical machine. In other words, one or more of the MCD device 202, the server devices 204(1)-204(n), or the client devices 208(1)-208(n) may operate on the same physical device rather than as separate devices communicating through a communication network(s) 210. Additionally, there may be more or fewer MCD devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on a computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
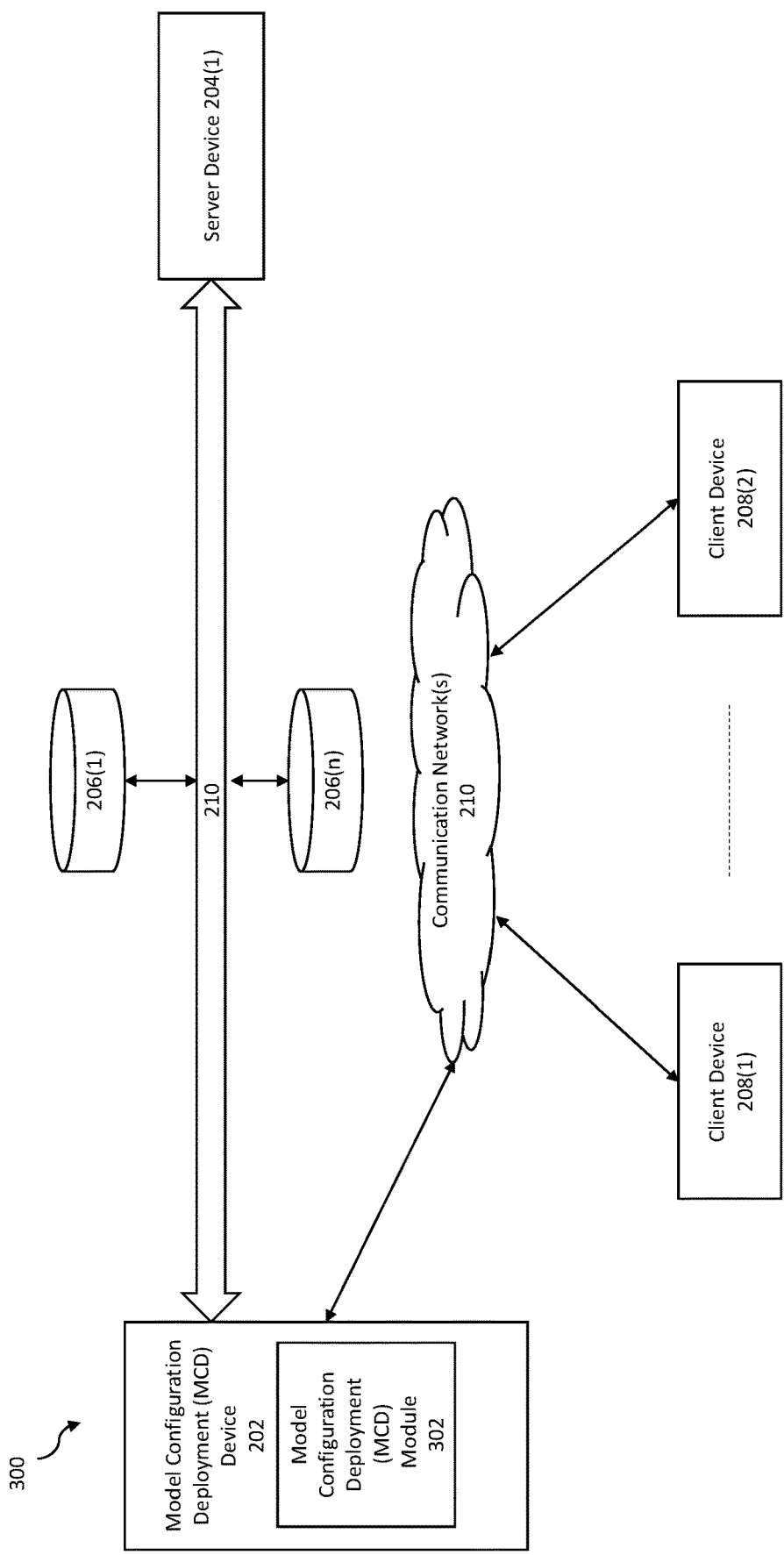
FIG. 3 illustrates an exemplary system for implementing a method for automatically deploying a low-code no-code model, in accordance with an exemplary embodiment.

FIG. 3 illustrates an exemplary system for implementing a method for automatically deploying a low-code no-code model, in accordance with an exemplary embodiment. As illustrated in FIG. 3, according to exemplary embodiments, the system may comprise an MCD device 202 including a model configuration deployment (MCD) module 302 that may be connected to a server device 204(1) and one or more repository from the repositories 206(1) . . . 206(n) via a communication network 210, but the disclosure is not limited thereto.

The MCD device 202 is described and shown in FIG. 3 as including the MCD module 302, although it may include other rules, policies, modules, databases, or applications, for example. As will be described below, the MCD module 302 is configured to implement a method for deploying a low-code no-code automated infrastructure.

An exemplary process 300 for implementing a mechanism for automatically deploying a low-code no-code model by utilizing the network environment of FIG. 2 is shown as being executed in FIG. 3. Specifically, a first client device 208(1) and a second client device 208(2) are illustrated as being in communication with the MCD device 202. In this regard, the first client device 208(1) and the second client device 208(2) may be "clients" of the MCD device 202 and are described herein as such. Nevertheless, it is to be known and understood that the first client device 208(1) and/or the second client device 208(2) need not necessarily be "clients" of the MCD device 202, or any entity described in association therewith herein. Any additional or alternative relationship may exist between either or both of the first client device 208(1) and the second client device 208(2) and the MCD device 202, or no relationship may exist.

Further, the MCD device 202 is illustrated as being able to access the one or more repositories 206(1) . . . 206(n). The MCD module 302 may be configured to access these repositories/databases for implementing the method for generating at least one from among rule-based recommendations and AI-based recommendations based on the analysis of the input.

The first client device 208(1) may be, for example, a smartphone. The first client device 208(1) may be any additional device described herein. The second client device 208(2) may be, for example, a personal computer (PC). The second client device 208(2) may also be any additional device described herein.

The process may be executed via the communication network(s) 210, which may comprise plural networks as described above. For example, in an exemplary embodiment, either or both the first client device 208(1) and the second client device 208(2) may communicate with the MCD device 202 via broadband or a cellular communication. These embodiments are merely exemplary and are not limiting or exhaustive.

Figure 4:
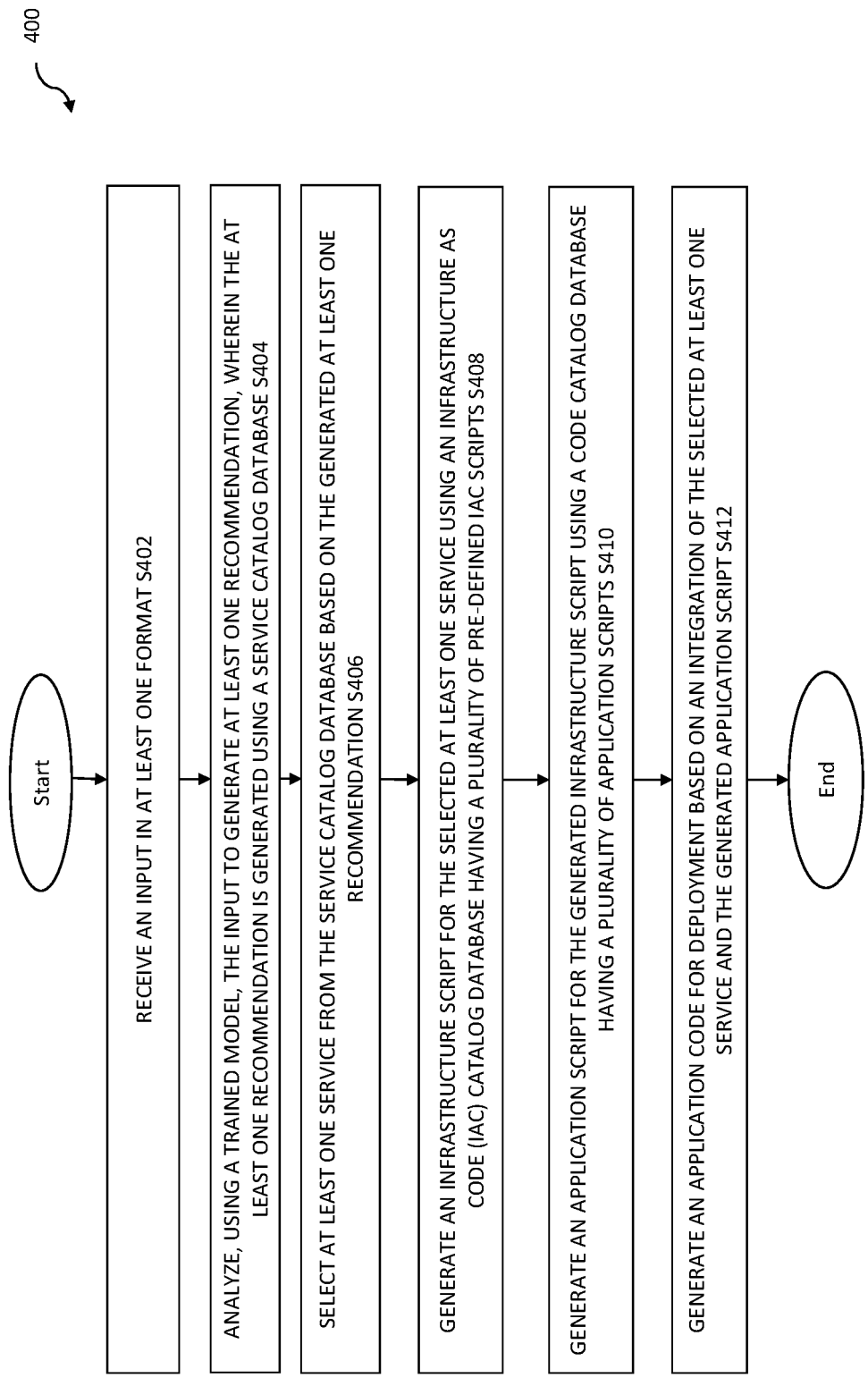
FIG. 4 illustrates an exemplary method flow diagram for automatically deploying a low-code no-code model, in accordance with an exemplary embodiment.

Referring to FIG. 4, an exemplary method 400 is shown for deploying a low-code no-code automated infrastructure, in accordance with an exemplary embodiment of the present disclosure. The method is implemented by at least one processor 104. As shown in FIG. 4, the method begins at step S402.

At step S402, the method includes receiving, by the at least one processor 104, an input in at least one format from a user device associated with the user. The at least one format comprises at least one from among a configuration file format, a text format, an audio format, a visual format, and/or a combination thereof. For example, the input is a configuration file. The user can upload the configuration file through a user interface (UI) rendered on the display screen of the user's device. In another example, the user can provide an audio/textual description of the problem statement (or the required software or model). The method may also include converting, by the at least one processor 104, the input in audio format into text format based at least upon implementation of natural language processing (NLP) techniques. In yet another example, the user can upload an image showing an architecture diagram of the problem statement (or the required software or model).

In particular, the method includes rendering, by the at least one processor 104, a UI on a display screen of the user device for receiving the input from the user. In particular, the UI is rendered on the display screen of the user device. In an embodiment, the UI may depict the conversational agent requesting the user for the input in the at least one format. The user may provide the input using an input device (such as, for example, keyboard, microphone, etc.).

In an exemplary embodiment, the method may include providing a bi-directional conversation between a server system and a user based at least on a conversational agent. The "conversational agent" represents an AI-based program or software designed to interact with users through natural language conversations. The conversational agent facilitates the bi-directional conversation between the server system and the user. The user may be prompted to ask questions or queries from the conversational agent. In an example, the user can initiate a conversation by sending a message, voice command, or an input to the conversational agent. For example, the input can be a question, command, request for information, and the like.

The conversational agent may then process the input based on various techniques, including for example, natural language processing (NLP) algorithms, text analysis, entity recognition, sentiment analysis, and the like. Further, the conversational agent understands the context of the bi-directional conversation and generates a response accordingly. In this manner, the server system facilitates the bi-directional conversation with the user based at least on the conversational agent.

For example, the user can query the conversational agent to write a code for an application that sends an acknowledgment email whenever a new email is received in the inbox. The user can send input queries to the conversational agent. The conversational agent can process the input queries and send corresponding responses to the user.

At step S404, the method includes analyzing, by the at least one processor 104 using a trained model, the input to generate at least one recommendation, wherein the at least one recommendation is generated using a service catalog database. The at least one recommendation may include at least an AI-based recommendation and/or a rule-based recommendation.

The service catalog database may include a list of available services, APIs, functionalities, components, and the like. In addition, the services are provided by at least one from among one or more underlying cloud infrastructures, one or more third-party vendors, one or more in-house development teams, and the like. For example, the service catalog database may include information about different types of services (e.g., software, infrastructure-related, etc.), APIs for interacting with the services, various functionalities, and components that can be employed in the development of the software application.

In another example, the service catalog database may include information related to the cloud infrastructure, including, for example, computing resources, storage, networking, pricing, and the like. For example, the service catalog database may include pricing information of various cloud infrastructures. The conversational agent can recommend to the user the cloud infrastructure with the least price. In this manner, the conversational agent can render recommendations on the display screen of the user device.

In one implementation, the rule-based recommendations involve using a predefined set of rules to generate recommendations. The predefined set of rules may be typically established by domain experts or system administrators. Additionally, the predefined set of rules may often be based on explicit criteria. When certain criteria are met, the corresponding recommendation may be provided to the user. In an example, for an e-commerce website, a rule-based recommendation could be: "If a user purchases a smartphone, recommend related accessories such as phone cases and screen protectors."

On the other hand, AI-based recommendations involve using machine learning algorithms and techniques to analyze large amounts of data and derive patterns from user interactions. The systems learn from historical user behaviors and use that knowledge to make predictions about user preferences. In general, AI-based recommendation systems are more adaptive and capable of identifying complex patterns, making them suitable for applications with diverse and dynamic user preferences.

In one implementation, the AI-based recommendations may be generated based at least on implementation of the trained model to process the input. For example, in a streaming platform, an AI-based recommendation could analyze a user's viewing history, preferences, and interactions to suggest movies or shows that align with the user's preferences.

Upon generation of the at least one recommendation, the method includes displaying, by the at least one processor 104 via a display, the rule-based recommendations and AI-based recommendations on the display screen of the user device of the user.

In an exemplary embodiment, the UI may be displayed on the display screen of the user device. The UI may depict the rule-based recommendations and AI-based recommendations on the display screen of the user device. In an example, the UI may depict the rule-based recommendations and AI-based recommendations as a response of the conversational agent. For example, the conversational agent may generate a response to the input, wherein the response includes the rule-based recommendations and AI-based recommendations. The user can then select services from the rule-based recommendations and AI-based recommendations as per convenience.

At step S406, the method includes selecting, by the at least one processor 104, at least one service from the service catalog database based on the generated at least one recommendation. The at least one processor 104 may select a single service that suffices to meet the user's requirements. Alternatively, in more complex scenarios, a plurality of services might be deemed necessary. The selection of the at least one service is based on the generated at least one recommendation. For example, if a user's input suggests they want to build a web application with a focus on e-commerce, the recommendation may facilitate the processor 104 in selecting services configured for online shopping platforms.

The service catalog may include a collection of various services, each with unique functions and capabilities. Each service in the service catalog may be categorized based on functionality, making it easier for the processor 104 to match the recommendation with the best-fitting service. For example, two different services might seem equally viable based on the recommendation. In an embodiment, the processor 104 may refer to additional parameters, like cost-effectiveness, performance efficiency, or user's past preferences, to make an informed decision. The user may be prompted via the user device to select the at least one service. In particular, the "user-selected services" include the services that the user selects from the rule-based recommendations and AI-based recommendations. The user-selected services may then be transmitted from the user device to the server system via the network.

At step S408, the method includes generating, by the at least one processor 104, an infrastructure script for the selected at least one service using an IAC catalog database having a plurality of pre-defined IAC scripts. The infrastructure script may be used to configure the computing resources required to execute a software application. In one embodiment, the infrastructure script may generated based at least on implementation of the trained model.

The IAC catalog database includes a collection of templates, configurations, and scripts defining provisioning and setup of infrastructure components required for development of the software application. For example, the IAC catalog database may include infrastructure deployment code curated based on at least one from among past working code from existing code base stored in the database and generative AI-based code generators.

The IAC refers to the practice of managing and provisioning infrastructure (e.g., servers, networks, databases, etc.) using code and automation. Additionally, IAC involves creating scripts that define the desired state of the infrastructure, allowing for consistent and repeatable deployment.

The term "pre-defined IAC scripts" herein may refer to pre-existing code templates and/or scripts that define how specific infrastructure components should be provisioned, configured, and/or managed. The pre-defined IAC scripts may be stored in the IAC catalog database for easy access and reference. In one implementation, the processor 104 may be configured to utilize the user-selected services to generate the IAC script(s). To generate the IAC script(s), the method may include identifying the infrastructure requirements and configurations needed to support the selected services (i.e., the user-selected services). The generated IAC script(s) (i.e., the infrastructure script) include the necessary code and instructions to provision and configure the underlying infrastructure components that support the user-selected services.

At step S410, the method includes generating, by the processor (104), an application script for the generated infrastructure script using a code catalog database having a plurality of application scripts. The code catalog database includes a repository of reusable code modules, libraries, and code APIs.

The processor 104 may be configured to select or generate an application script. The generation of the application script may be based on multiple variables. The multiple variables may include a first variable that corresponds to the input, a second variable that corresponds to the generated at least one recommendation, and a third variable that corresponds to the generated infrastructure scripts.

The first variable, which is the "input," may comprise any or a combination of natural language text describing the application's intended function to configuration files that lay out the specifications in a structured format. If the user had uploaded an architecture diagram as part of this input, it would have been translated into machine-readable data points through advanced image recognition algorithms. The converted data points join the pool of information derived from the input.

Secondly, the processor 104 comprises "the generated at least one recommendation," which itself is a complex entity. These recommendations are outcomes of a model that has analyzed the input against a robust service catalog database. Each recommendation is not a single entity but may comprise several layers of suggested services, APIs, or functionalities. These layers are hierarchically organized, with core services at the bottom and optional, value-adding services at the top. The user's need for speed, reliability, or other specific features may tip the scales in favor of certain services over others.

Thirdly, "the generated infrastructure scripts" are not static files but dynamic entities. The IAC scripts are pre-generated, yes, but they are not one-size-fits-all. Before reaching step S410, these scripts would have been tailored to suit the services selected in the previous steps. For instance, if a particular database service is recommended, the corresponding IAC scripts would include commands to set up and configure this specific database.

In an embodiment, the processor 104 may use AI to generate an application script that is adapted to the user's preference and project requirements. The process involves utilizing AI-generated recommendations that have been previously created by analyzing the user's input and comparing it to a comprehensive service catalog database. Once the processor 104 has the AI-generated recommendations, it proceeds to search through the code catalog database. This database is a repository of pre-existing application scripts, modules, and functionalities. Instead of just selecting a readily available script, the processor 104 uses the AI recommendations to synthesize a custom application script.

In an example, a user is working with a computer system tasked with setting up and managing a network of computers or services. The process begins with the creation of an infrastructure script (such as a set of detailed instructions), which guides the setup of this network. To enhance the functionality of this network, the system needs to generate application scripts. The system (or processor) sifts through the code catalog database to select the appropriate scripts for the network's needs. These scripts provide precise directions for running particular applications or services within the network infrastructure. For example, in setting up a network for a small business. The processor may first develop an infrastructure script, which includes basic network setup, computer connections, and security protocols. Following this, the processor may select relevant application scripts from the code catalog database. These might include scripts for an email service to facilitate employee communication, a file storage system for document handling, and a database management system for customer data organization. Each script may be tailored to install and run these services efficiently on the newly established network, transforming a simple collection of connected computers into a fully functional system with diverse capabilities like email, file sharing, and database management.

For example, the code catalog database may include Continuous Integration (CI)/Continuous Deployment (CD) code curated based on at least one from among past working code from existing code base stored in the database and generative AI-based code generators. Generally, CI code includes scripts and configurations that automate the integration of code changes from multiple developers into a shared repository. Generally, CD code encompasses the automation of the deployment process after successful integration and testing. In one example, the CI/CD code includes the configuration files that define the environment, dependencies, build steps, testing procedures, and deployment instructions.

In one example, the conversational agent may display various application scripts to the user on the user device. The user can then select the required application script that aligns with the needs or objectives of the user, from the various application scripts. Upon selection, the application script can be utilized to customize, enhance, or modify the behavior of the software application. The application script may add specific features, automate tasks, or alter the behavior of the software application in a desired manner. In another example, the application script is selected based at least on the implementation of the trained model and the user-selected services.

In an example, a user has provided input via text and a configuration file specifying the need for a web application with user authentication and a Representational State Transfer (REST)-ful API backend. This input is processed, and the trained model generates recommendations based on a service catalog database. For example, it might recommend using Amazon Web Services (AWS)™ Lambda™ for serverless architecture and Amazon Cognito for user authentication. These recommendations contribute to the creation of infrastructure scripts. Thereafter, the processor accesses the code catalog database that contains pre-written application scripts for various functionalities like user authentication, API creation, data manipulation, etc. Given that the input indicated a need for user authentication and a RESTful API, and knowing that the infrastructure scripts are aligned with AWS services, the processor 104 selects application scripts that specifically (1) Implement user authentication using Amazon Cognito. (2) Set up a RESTful API backend to be deployed on AWS Lambda. The processor 104 then generates a new application script by integrating these selected scripts with the configurations defined in the generated infrastructure scripts. This ensures that the AWS™ Lambda and Amazon Cognito services will work seamlessly once deployed, aligning perfectly with the user's initial requirements and the system's recommendations.

In an exemplary embodiment, once the processor 104 generates the application script using AI recommendations, the next vital stage is its seamless deployment into the target environment. This is facilitated by an automated CI/CD pipeline, which is initialized and configured based on the specifics received from the user's input and generated recommendations. In an embodiment, the user's input could directly influence the CI/CD configuration. For instance, if the user has emphasized the need for rigorous testing, the CI/CD pipeline can be configured to include multiple stages of automated tests. Similarly, if the user's input suggests a need for deployment across multiple environments such as, development, staging, and production, the CI/CD pipeline may be set up to handle these multiple deployments efficiently.

Moreover, the automated CI/CD pipeline may be dynamically adapted. For example, based on the AI-generated recommendations, specific build and deploy scripts adapted to the selected services and generated infrastructure scripts are incorporated into the pipeline. This ensures that the CI/CD process is in harmony with the personalized application script and infrastructure setup, thereby reducing errors and ensuring a smoother transition from code to deployment.

In an example, a user who wants to create an e-commerce application with a focus on fast load times and robust security features. They upload a configuration file and a text description as input. The processor uses AI to recommend a serverless architecture and specific security services, generating infrastructure scripts accordingly. Based on all these factors, the processor selects an application script from the code catalog that fits these needs. Automated CI/CD is then configured: the pipeline includes quick unit tests and deploys the application across staging and production environments with SSL encryption, all based on the user's initial input for speed and security.

At step S412, the method includes generating, by the at least one processor 104, an application code for deployment based on an integration of the selected at least one service and the generated application script. For example, the user-selected services may represent functionalities or features that the user wants to include in the software application. The application script may represent a piece of code that defines how the software application should function or behave. The integration is performed in near real-time to ensure that the user does not experience significant waiting times when customizing or modifying the software application.

Further, the application code is deployed automatically in a target environment. The target environment may be configured based at least on the provisions defined in the IAC catalog database. In some examples, the software application can correspond to a web application, a mobile application, a model, or any other type of software. The "target environment" can include, but is not limited only to, web server Environment (such as Apache, Nginx); mobile operating systems (such as iOS, Android); cloud platforms (such as Amazon Web Services, Microsoft Azure, Google Cloud Platform); desktop operating systems (such as Windows, macOS, Linux); embedded systems (such as microcontrollers in appliances, digital watches); enterprise systems (such as integrated Information Technology (IT) infrastructures with databases, servers); and Internet of Things (IoT) devices, such as smart home appliances, wearable tech, and industrial sensors.

The term "application" refers to the actual program, or model that performs specific functions or tasks. The target environment may correspond to a server, cloud infrastructure, or any other computing environment, where the software application will be deployed and run. The integrated application code may include pre-defined application script and any additional code related to the user-selected services.

The term "provisions" herein may refer to protocols or rules that outline how the target environment should be structured and what resources should be allocated to ensure the proper functioning of the software application.

Figure 5:
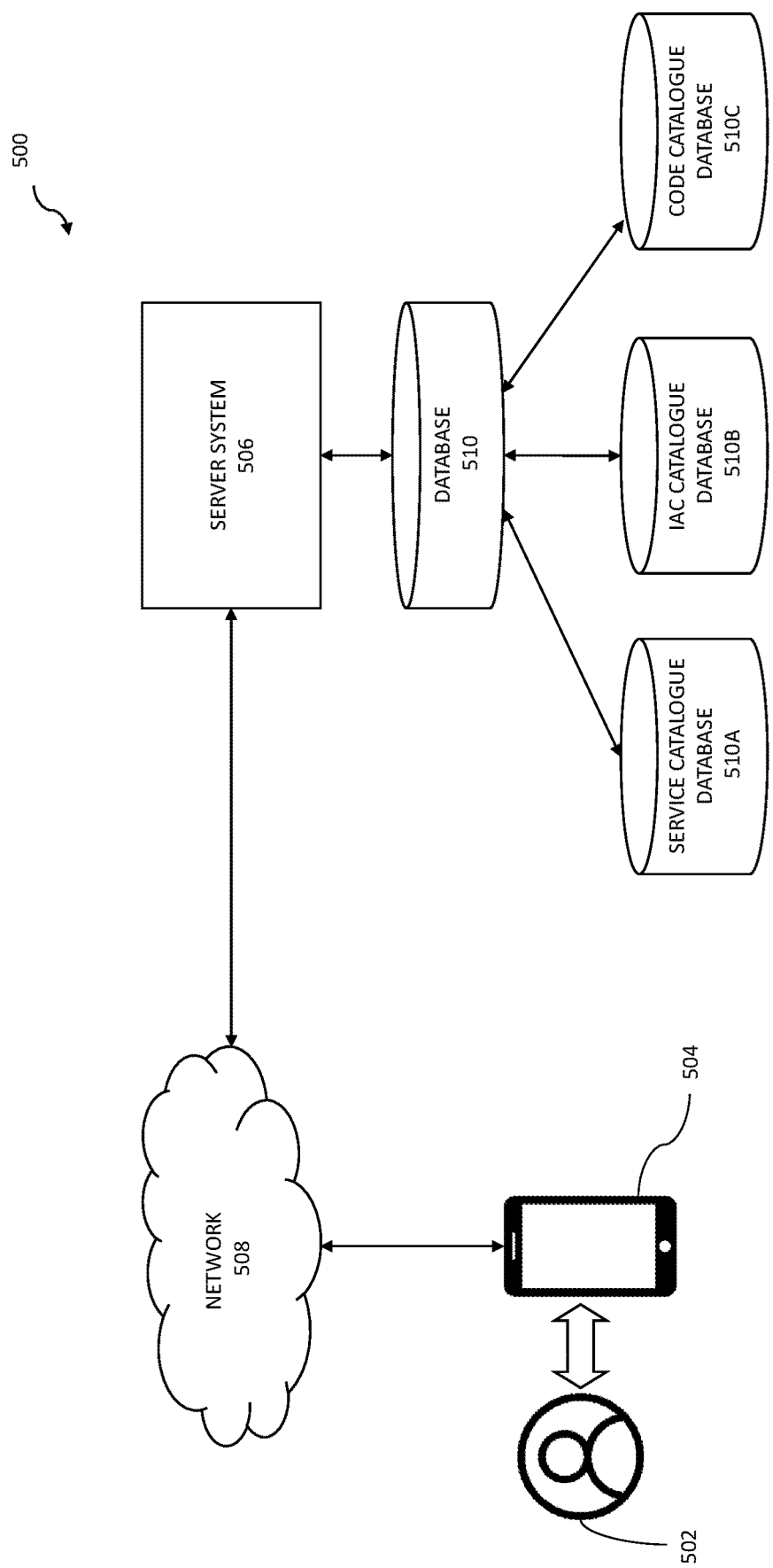
FIG. 5 illustrates a block diagram of an environment for automatically deploying a low-code no-code model, in accordance with an exemplary embodiment.

FIG. 5 illustrates a block diagram of an environment 500 for deploying a low-code no-code automated infrastructure, in accordance with an exemplary embodiment. As illustrated in FIG. 5, the environment 500 is illustrated with entities including, for example, a user 502, a user device 504, a server system 506, a network 508, a database 510 associated with the server system 506. In an embodiment, the database 510 is associated with a service catalogue database 510A, an IAC catalogue database 510B, and a code catalogue database 510C.

Various entities in the environment 500 may connect to the network 508 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, future communication protocols, and/or any combination thereof.

For example, the network 508 may include multiple different networks, such as a private network made accessible by the server system and a public network (e.g., the Internet, etc.) through which the server system may communicate.

The user 502 may correspond to any individual, organization, representative of a corporate entity, a non-profit organization, or any other person who accesses the conversational agent on the user device 504. In one embodiment, the user 502 may utilize the user device 504 to connect with the server system 506 via the network 508. In one embodiment, the server system 506 is configured to implement an execution of a method (e.g., the method 400) for automatically deploying a low-code no-code model.

In an exemplary embodiment, the user 502 may be a non-technical user and cannot input configuration files for the required model or software. The user 502 may simply use the method and system of the exemplary embodiments described herein to deploy the software and/or the model (e.g., software application).

The user device 504 is associated with the user 502. For instance, the user device 504 may correspond to any suitable electronic or computing device such as a smartphone, a personal computer, a laptop, a personal digital assistant (PDA), an electronic tablet, a desktop computer, a wearable device such as a smartwatch, a smart device such as smart TV or smart appliance, and/or a smartwatch, etc., among other suitable electronic devices.

For example, the server system 506 facilitates a bi-directional conversation between the server system 506 and the user 502 based at least on a conversational agent. In some examples, the conversational agent includes at least one from among virtual assistant, virtual chatbot, and the like.

Next, the server system 506 receives, an input from the user device 504 associated with the user 502. The input is received in at least one format via the conversational agent. In an example, the input is received in the form of configuration files. In another example, the input is received in the form of text input. In yet another example, the input is received in the form of audio-visual input.

Then, the server system 506 analyzes, using a trained model, the received input to generate at least one recommendation, wherein the at least one recommendation is generated using a service catalog database 510A. The at least one recommendation may include a rule-based recommendation and/or an AI-based recommendation.

The service catalog database 510A includes a list of available services, APIs, functionalities, components, and the like. The services are provided by at least one from among one or more underlying cloud infrastructures, one or more third-party vendors, and/or one or more in-house development teams. Next, at least one service may be selected from the service catalog database 510A. The at least one service may be selected based on the generated at least one recommendation.

Further, the server system 506 generates an infrastructure script for the selected at least one service using the IAC catalog database 510B having a plurality of pre-defined IAC scripts. The infrastructure script configures the computing resources required to execute a software application. In an embodiment, selection of service is performed based on an input received from the user device 504.

Furthermore, the server system 506 generates an application script for the generated infrastructure script using a code catalog database 510C having a plurality of application scripts.

Also, the server system 506 generates, by the at least one processor 104, an application code for deployment based on an integration of the selected at least one service and the generated application script. The application code is deployed automatically in a target environment. The target environment is configured based at least on the provisions defined in the IAC catalog database 510B.

The database 510 is associated with the server system 506. The database 510 may be adapted to store information, such as, but not limited to, meta-data associated with the bi-directional conversation, the plurality of pre-defined IAC scripts, the plurality of application scripts, pre-defined services, and the like. In some examples, the database 510 may include available services, APIs, functionalities, components, templates, configurations, scripts, reusable code modules, libraries, code APIs, and the like.

In an implementation, the database 510 may be managed, accessed, or viewed using a database management system (DBMS). In another implementation, the database 510 may be managed, accessed, or viewed using a relational database management system (RDBMS).

Accordingly, with this technology, an optimized process for deploying a low-code no-code automated infrastructure is disclosed. As evident from the above disclosure, the present solution provides significant technical advancement over the exciting solutions by providing a cloud-native solution employing IAC deployment and configurable pipelines.

The present disclosure provides multiple advantages, such as one-click deployment, unified architecture, real-time endpoint deployment, on demand batch inferencing, scheduled inferencing, model monitoring dashboards, data drift and model drift identification, metadata tracking and management, and the like.

Although the present disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the present disclosure has been described with reference to particular means, materials, and embodiments, the present disclosure is not intended to be limited to the particulars disclosed; rather the present disclosure extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The terms "computer-readable medium" and/"computer-readable storage medium" shall also include any storage medium that is capable of storing, encoding, or carrying a set of instructions for execution by a processor or that causes a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

According to an aspect of the present disclosure, a non-transitory computer-readable storage medium storing instructions for deploying a low-code no-code infrastructure is disclosed. The instructions include executable code which, when executed by a processor, may cause the processor to receive an input from a user in at least one format; analyze the input to generate at least one recommendation based on a service catalog database; select at least one service based on the generated at least one recommendation; generate an infrastructure script from a plurality of pre-defined IAC scripts stored in an IAC catalog database based on the selected at least one service; generate at least one application script based on a plurality of application scripts stored in a code catalog database, the input, the generated at least one recommendation, and the generated infrastructure scripts; and generate an application code by integration of the selected at least one service and the generated at least one application script.

The at least one format includes at least one from among configuration files, text input, audio-visual input, and/or a combination thereof. The AI-based recommendations are generated based at least on implementation of the trained model to process the input. The service catalog database includes a list of available services, APIs, functionalities, and components, wherein the services are provided by at least one from among one or more underlying cloud infrastructures, one or more third-party vendors, and/or one or more in-house development teams.

The IAC catalog database includes a collection of templates, configurations, and scripts defining provisioning and setup of infrastructure components required for development of the software application. The code catalog database includes a repository of reusable code modules, libraries, and code APIs.

Although the present application describes specific embodiments which may be implemented as computer programs or code segments in computer-readable media, it is to be understood that dedicated hardware implementations, such as application-specific integrated circuits, programmable logic arrays, and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically deploying a low-code no-code model, the method being implemented by at least one processor, the method comprising:
   receiving, by the at least one processor from a user, an input in at least one format;
   analyzing, by the at least one processor using a trained model, the input to generate at least one recommendation, wherein the at least one recommendation is generated using a service catalog database;
   selecting, by the at least one processor, at least one service from the service catalog database based on the generated at least one recommendation;
   generating, by the at least one processor, an infrastructure script for the selected at least one service using an Infrastructure as Code (IAC) catalog database having a plurality of pre-defined IAC scripts;
   generating, by the at least one processor, an application script for the generated infrastructure script using a code catalog database having a plurality of application scripts; and
   generating, by the at least one processor, an application code for deployment based on an integration of the selected at least one service and the generated application script.

2. The method as claimed in claim 1, wherein the application code is deployed automatically in a target environment, wherein the target environment is configured based at least on provisions defined in the IAC catalog database.

3. The method as claimed in claim 1, wherein the at least one format comprises at least one from among a configuration file format, a text format, an audio format, a visual format, and a combination thereof.

4. The method as claimed in claim 1, further comprising:
   rendering, by the at least one processor, a user interface (UI) on a display screen of a user device for receiving the input from the user.

5. The method as claimed in claim 1, wherein the at least one recommendation comprises at least one from among an Artificial Intelligence (AI)-based recommendation and a rule-based recommendation.

6. The method as claimed in claim 1, wherein the service catalog database comprises a list of available services, application programming interfaces (APIs), functionalities, and components, and wherein the list of available services is provided by at least one from among at least one underlying cloud infrastructure, at least one third-party vendor, and at least one in-house development team.

7. The method as claimed in claim 1, wherein the IAC catalog database comprises at least one from among a collection of templates, configurations, and scripts defining provisioning and setup of infrastructure components required for development of an application.

8. The method as claimed in claim 1, wherein the code catalog database comprises a repository of reusable code modules, libraries, and code application programming interfaces (APIs).

9. A computing device configured to implement an execution of a method for automatically deploying a low-code no-code model, the computing device comprising:
   a processor;
   a memory; and
   a communication interface coupled to each of the processor and the memory,
   wherein the processor is configured to:
      receive, from a user via the communication interface, an input in at least one format;

analyze, using a trained model, the input to generate at least one recommendation, wherein the at least one recommendation is generated using a service catalog database;

select at least one service from the service catalog database based on the generated at least one recommendation;

generate an infrastructure script for the selected at least one service using an Infrastructure as Code (IAC) catalog database having a plurality of pre-defined IAC scripts;

generate an application script for the generated infrastructure script using a code catalog database having a plurality of application scripts; and generate an application code for deployment based on an integration of the selected at least one service and the generated application script.

10. The computing device as claimed in claim 9, wherein the application code is deployed automatically in a target environment, wherein the target environment is configured based at least on provisions defined in the IAC catalog database.

11. The computing device as claimed in claim 9, wherein the at least one format comprises at least one from among a configuration file format, a text format, an audio format, a visual format, and a combination thereof.

12. The computing device as claimed in claim 9, wherein the processor is further configured to render a user interface (UI) on a display screen of a user device for receiving the input from the user.

13. The computing device as claimed in claim 9, wherein the at least one recommendation comprises at least one from among an Artificial Intelligence (AI)-based recommendation and a rule-based recommendation.

14. The computing device as claimed in claim 9, wherein the service catalog database comprises a list of available services, application programming interfaces (APIs), functionalities, and components, and wherein the list of available services is provided by at least one from among at least one underlying cloud infrastructure, at least one third-party vendor, and at least one in-house development team.

15. The computing device as claimed in claim 9, wherein the IAC catalog database comprises at least one from among a collection of templates, configurations, and scripts defining provisioning and setup of infrastructure components required for development of an application.

16. The computing device as claimed in claim 9, wherein the code catalog database comprises a repository of reusable code modules, libraries, and code application programming interfaces (APIs).

17. A non-transitory computer-readable storage medium storing instructions for automatically deploying a low-code no-code model, the storage medium comprising executable code which, when executed by a processor, causes the processor to:

receive, from a user, an input in at least one format;

analyze, using a trained model, the input to generate at least one recommendation, wherein the at least one recommendation is generated using a service catalog database;

select at least one service from the service catalog database based on the generated at least one recommendation; generate an infrastructure script for the selected at least one service using an Infrastructure as Code (IAC) catalog database having a plurality of pre-defined IAC scripts;

generate an application script for the generated infrastructure script using a code catalog database having a plurality of application scripts; and generate an application code for deployment based on an integration of the selected at least one service and the generated application script.

18. The storage medium as claimed in claim 17, wherein the application code is deployed automatically in a target environment, wherein the target environment is configured based at least on provisions defined in the IAC catalog database.

19. The storage medium as claimed in claim 17, wherein the at least one format comprises at least one from among a configuration file format, a text format, an audio format, a visual format, and a combination thereof.

20. The storage medium as claimed in claim 17, wherein when executed by the processor, the executable code further causes the processor to render a user interface (UI) on a display screen of a user device for receiving the input from the user.

* * * * *